2,914,357
METHOD OF DISPENSING SOLIDS IN POLYMERIZATION MIXTURES

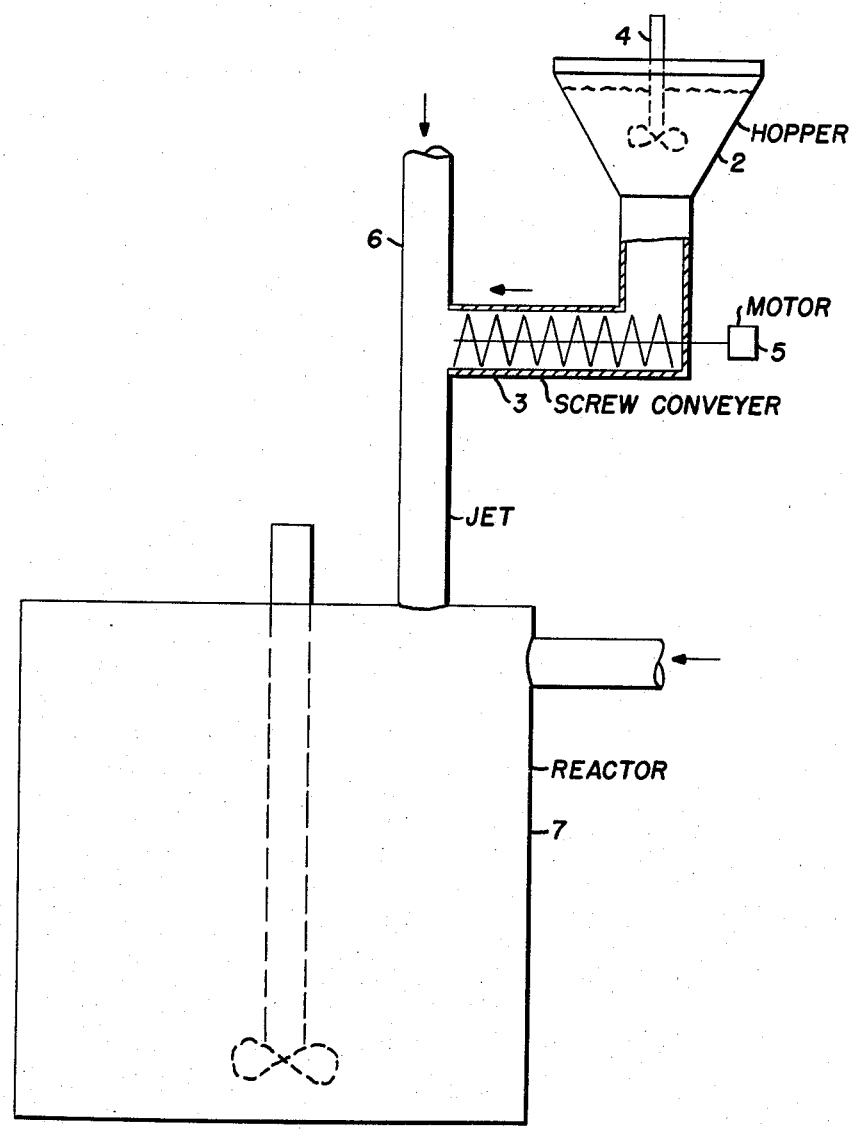

Hans G. Goering, Elizabeth, Helmuth G. Schneider, Westfield, and Philip D. Spillane, Spotswood, N.J., assignors to Esso Research and Engineering Company, a corporation of Delaware Application December 31, 1953, Serial No. 401,688

3 Claims. (Cl. 302—66)

This invention relates to apparatus for the controlled introduction of solid materials to a reacting system. In a more specific aspect, it relates to means for adding solids to a low temperature polymerization system. In a still more specific aspect, it relates to such a system in which powdered solid catalyst is blown into a low temperature polymerization reaction zone to give controlled dispersion and greatly improved catalyst efficiencies.

It is necessary that a special type of solid catalyst disperser be used for low temperature polymerization systems, particularly for the polymerization of isobutylene using aluminum chloride as the catalyst. The polymerization is highly exothermic and, therefore, both good dispersion of the catalyst particles and adequate cooling provisions for the reactor liquor into which the catalyst is dispersed are necessary. It is also necessary to have the two reactants, catalyst and feed, completely segregated up to the point of contact. At this point there must be a zone of high turbulence and efficient means of heat removal.

Solid $AlCl_3$ polymerizations of light hydrocarbon olefins have shown the need for a suitable method of catalyst injection for both batch and continuous processes, since control of conversion level and polymer molecular weight (viscosity) as well as reactor fouling depend on the type of catalyst dispersion used.

Simple "jet" injection, i.e. blowing the powdered $AlCl_3$ into the reactor from a simple blow case using a stream of dry nitrogen as a carrier resulted in repeated clogging of lines and slugwise dispersion of the catalyst in the reactor liquor. Using a "fluidizing" technique gave improved dispersion, however, the stream of injected catalyst would invariably be interrupted on the depletion of the catalyst "fines."

Vapor-phase injection by passing a nitrogen stream through a heated bed of $AlCl_3$ presented difficulties in that clogging, caused by condensation of $AlCl_3$ on the walls of the tubes leading to the reactor, was experienced. Also, since at least part of the $AlCl_3$ was injected into the reactor liquor as a gas, localized heating, due to the heat of sublimation of the $AlCl_3$, produced very low molecular weight polymers.

In accordance with the present invention, the above-mentioned difficulties are all avoided and the objects of the invention easily obtained.

One object of the invention is to provide an efficient means of introducing a solid at a controlled rate to a low temperature exothermic reaction zone.

Another object is to provide an efficient means of introducing solid granular anhydrous aluminum chloride to a low temperature reaction system catalyzed by aluminum chloride.

Numerous other objects and advantages will be apparent to those skilled in the art upon reading the accompanying specification, claims and drawings.

In the drawing a container or closed hopper 2 is provided for the solid material which is in granular or powdered form. The solid material is fed by gravity through the hopper to a screw conveyor 3 attached to the bottom of the hopper. A pressure slightly in excess of that in the polymerization reactor is maintained in the hopper to prevent blow back. A stirrer 4 is provided in the hopper also to prevent bridging of the powdered material. Another means of preventing bridging of the powdered material is by gently blowing an inert, dry gas through the hopper contents. Any suitable means for driving screw conveyor 3 may be provided, e.g. a variable speed electric motor 5.

Screw conveyor 3 discharges into jet 6 into which a constant stream of carbon dioxide, nitrogen or other dry, inert gas is introduced at its upper end to blow the solid particles from the exit end of the screw conveyor into the reaction zone 7. Jet 6 is preferably one giving a high outlet gas velocity so that the solid particles are blown into the reaction zone in finely divided form.

The catalyst dispersion means described above has been used to introduce powdered aluminum chloride to a one-gallon metal-jacketed reactor cooled to —45° F. by circulating cold methyl ethyl ketone through the jacket and used for the polymerization of isobutylene. The following results were obtained showing the improvement obtained over manual dispersion:

| Run No. | Method of $AlCl_3$ Dispersion | Length of Run, min. | Catalyst Efficiency, lb. polymer per lb. catalyst |
|---|---|---|---|
| 1 | Manual | 100 | 213 |
| 2 | do | 225 | 65 |
| 3 | Mechanical (screw feeder and gas jet). | 160 | 2,500 |
| 4 | do | 219 | 1,940 |

The above data clearly show that unexpectedly high catalyst efficiencies are obtained by the dispersion device of the present invention, polymer being prepared at the rate of 2500 lbs. per lb. of catalyst when the disperser of the present invention was used compared to only 213 lbs. of polymer per lb. of catalyst when the catalyst was manually dispersed.

The present method of introducing solid powdered aluminum chloride to a catalytic reactor is also superior to direct fluidization. According to this method a glass cylinder closed at the bottom and containing aluminum chloride powder. An outlet tube extending almost to the surface of the aluminum chloride with an inlet tube terminating in the upper part of the cylinder. Carbon dioxide is introduced through the inlet tube in a continuous stream. Slugging is practically eliminated by increasing the gas flow rate slowly from no flow to the desired level.

While this technique allows a measured quantity of aluminum chloride to be transferred to a vessel from a holder of a given capacity by controlling the rate of flow of gas used to fluidize the powder, the flow rate has to be increased slowly to prevent slugging. Thus the quantity of gas used to lift over a pound of aluminum chloride increases as the flow rate increases since it takes more time to reach the higher velocities. Accordingly, the injection of aluminum chloride powder into a reactor vessel by the above method is not practical since the volume of gas required to lift a given quantity of aluminum chloride over is high ranging from about 30 cubic ft. of carbon dioxide per lb. of aluminum chloride at 46% carry over to about 130 cu. ft. per lb. at 100% carry over at gas velocities of 2.4 and 14.9 ft./sec. respectively. Furthermore, such a method results in selection of particle size. Maintenance of the desired solid flow requires, therefore, wide variations in gas flow.

The nature and objects of the present invention having been thus described and illustrated, what is claimed as new and useful and desired to be secured by Letters Patent is:

1. A process for feeding powdered catalyst to a polymerization reaction zone which comprises introducing a vertical stream of inert gas into said reaction zone; discharging the powdered catalyst perpendicularly into said inert gas with a pressure slightly in excess of that maintained in the reaction zone; and maintaining the inert gas which is introduced at such a level that the catalyst is blown to provide a finely divided controlled catalytic dispersion in said reaction zone.

2. The process according to claim 1 in which the powdered catalyst is aluminum chloride.

3. The process according to claim 1 in which the inert gas is selected from the group consisting of carbon dioxide and nitrogen.

References Cited in the file of this patent

UNITED STATES PATENTS

| | | |
|---|---|---|
| 1,616,547 | Pontoppidan | Feb. 8, 1927 |
| 1,677,691 | Smith | July 17, 1928 |
| 1,737,090 | Meyers | Nov. 26, 1929 |
| 1,798,857 | Tyler | Mar. 31, 1931 |
| 2,304,827 | Jewell | Dec. 15, 1942 |